Figure 4:
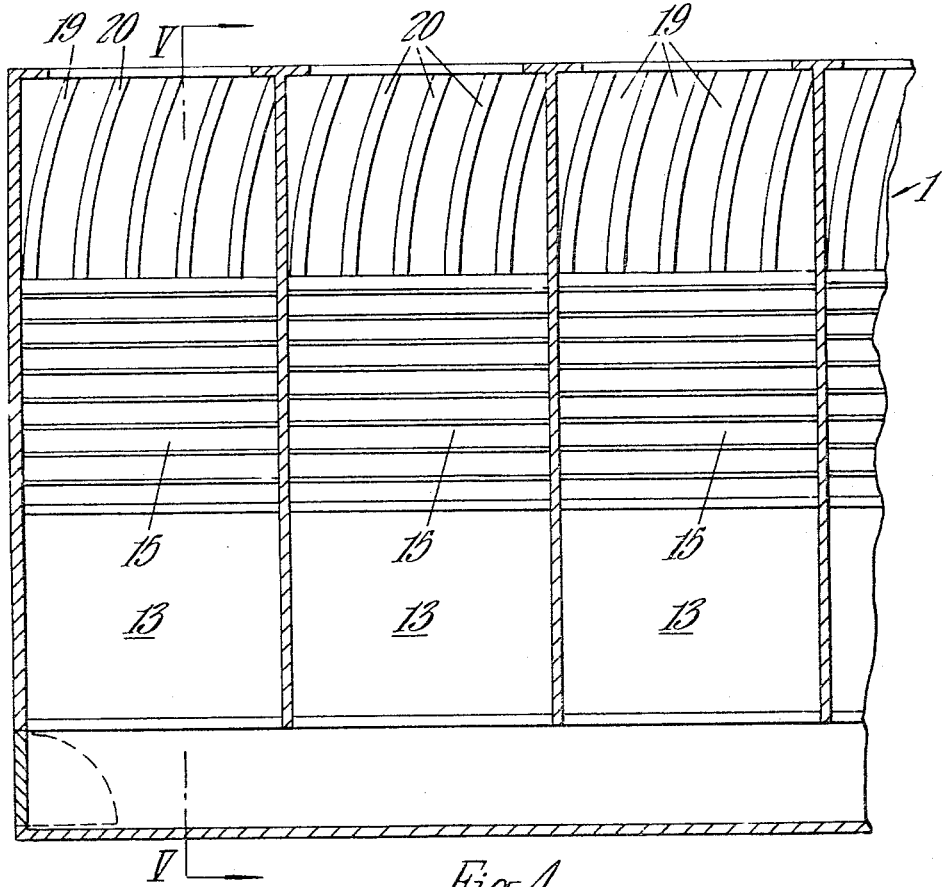

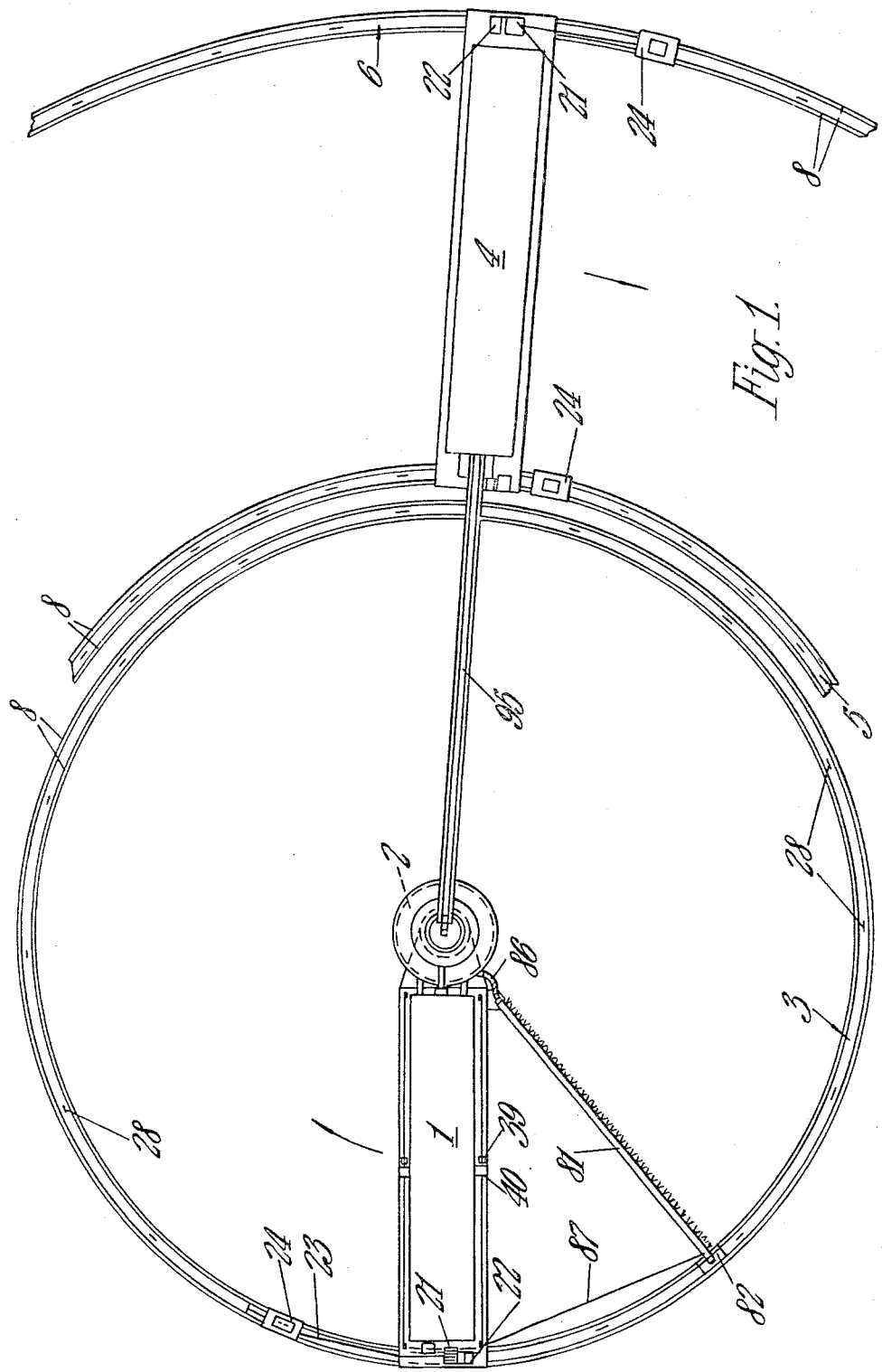

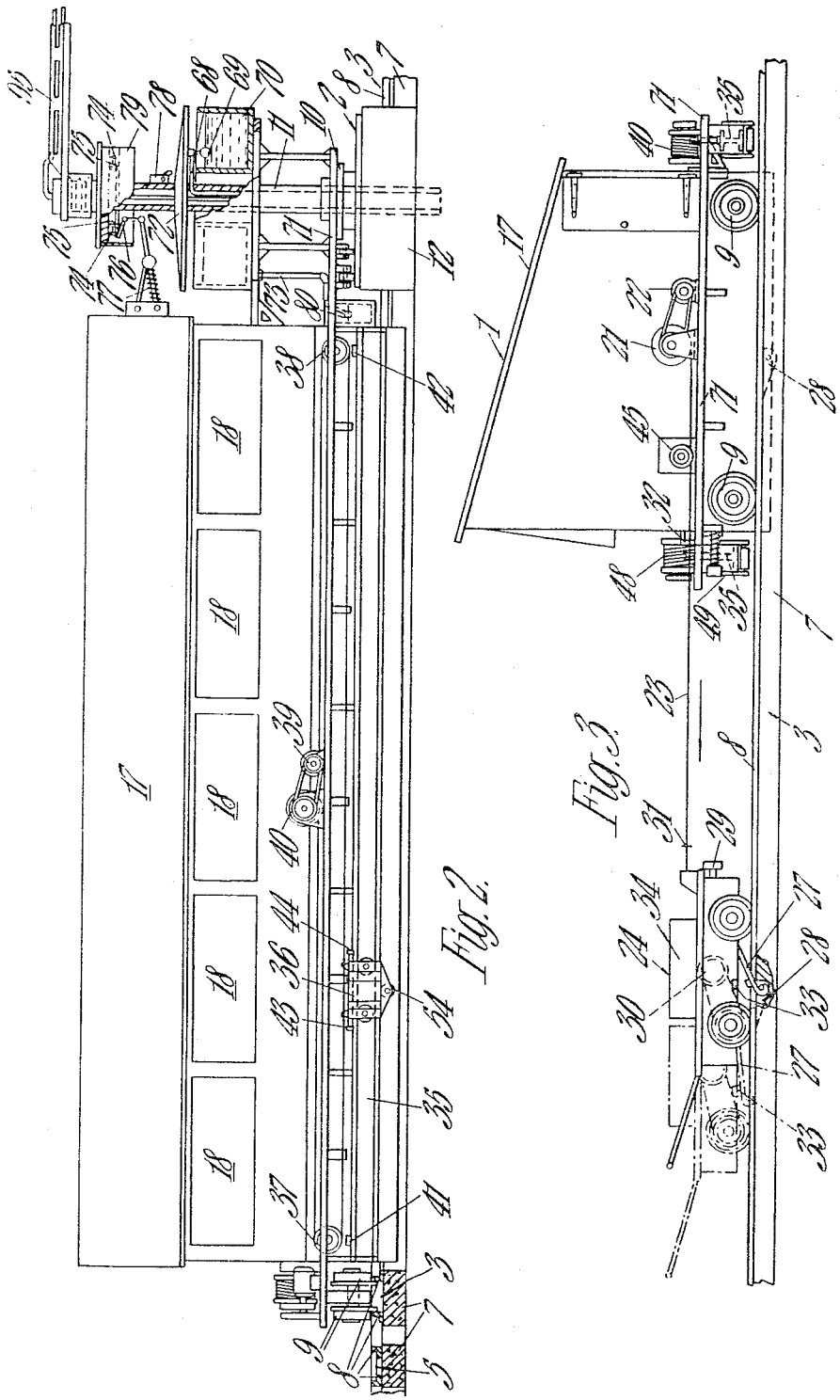

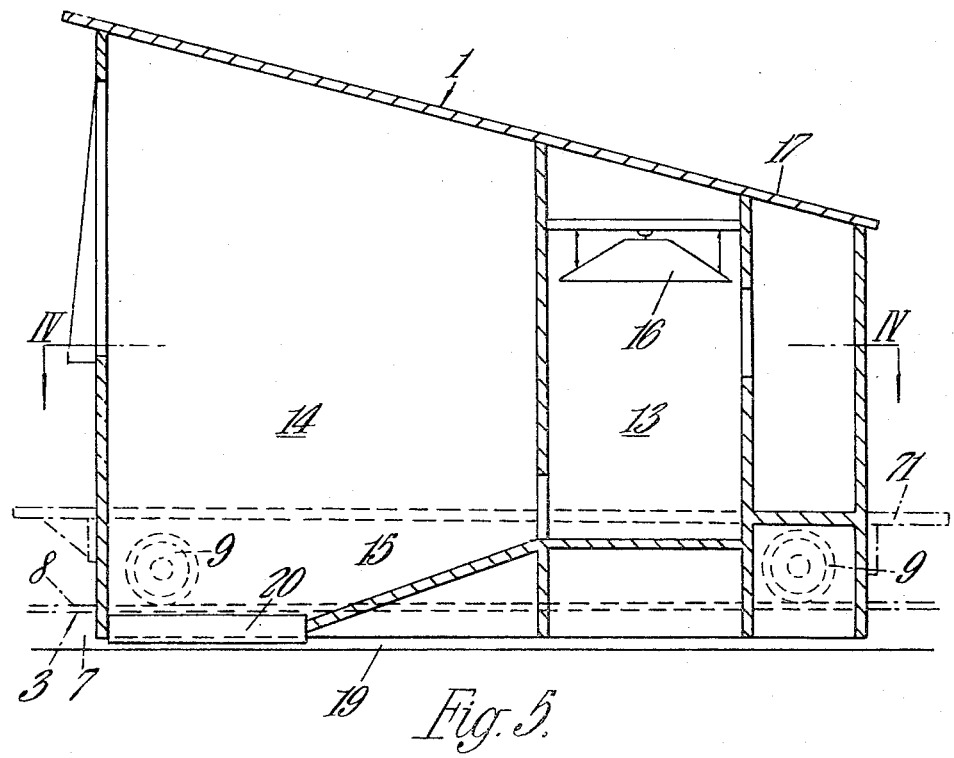
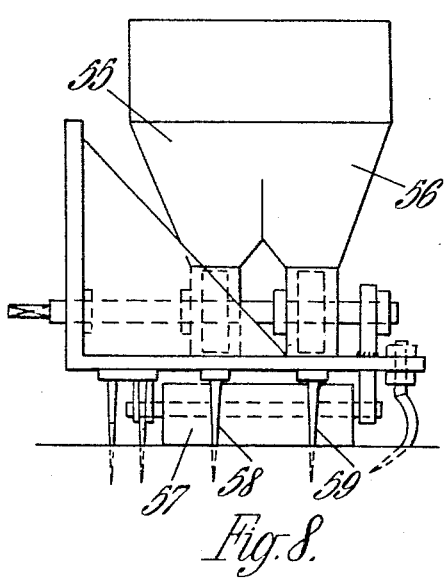
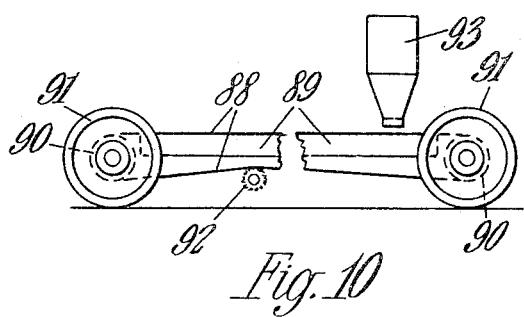
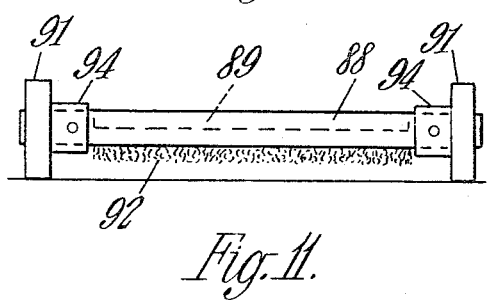

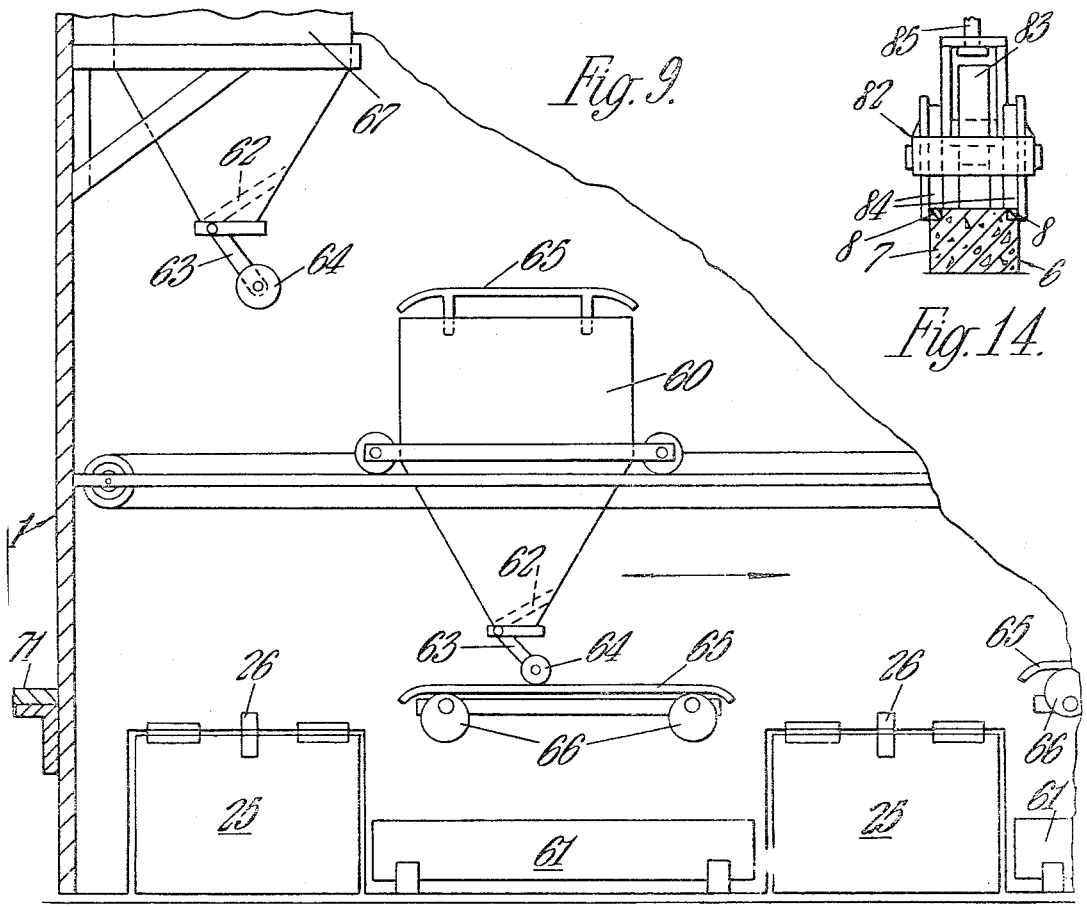
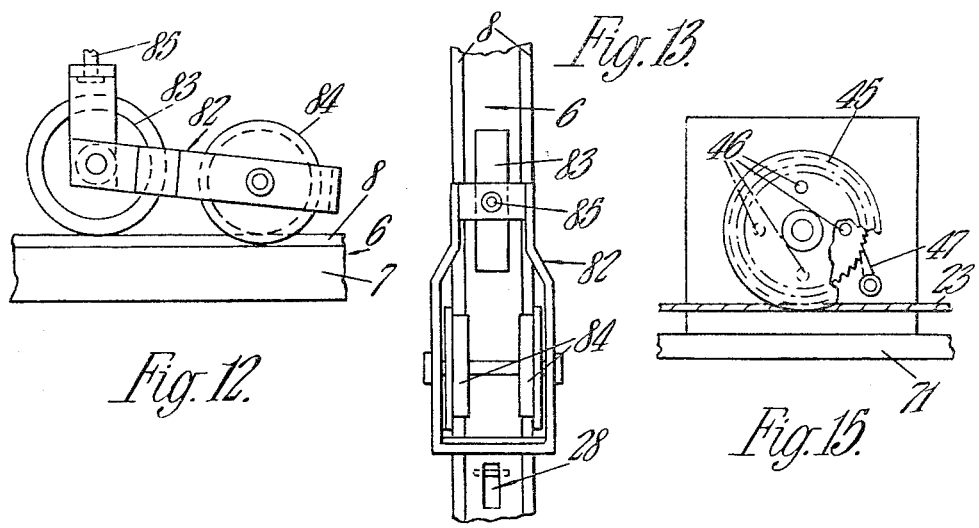

United States Patent Office

3,302,616
Patented Feb. 7, 1967

3,302,616
LIVESTOCK ENCLOSURE
Rowland Aquila Bradshaw, 46 St. Aidans St.,
Stoke-on-Trent, England
Filed Sept. 9, 1965, Ser. No. 486,030
Claims priority, application Great Britain, Sept. 17, 1964,
37,931/64
6 Claims. (Cl. 119—21)

The invention relates to livestock enclosures, and more particularly to enclosures for confining livestock while feeding upon forage or grass upon a cultivated area of ground, in such a manner as to prevent the livestock from treading upon or fouling the crop before the latter is accessible as food.

The invention is directed to a mobile enclosure for livestock which is open below to provide access to forage over which the enclosure is positioned, in which the enclosure is motor driven so as to move step by step around a closed path, with the motor being caused to operate by the action of the livestock within the enclosure reaching for forage.

The invention further relates to an enclosure as set forth in the preceding paragraph in which the enclosure follows a circular path around a fixed point.

The invention still further relates to an enclosure as set forth above having at least one displaceable member positioned in the front boundary thereof and close to the ground, which member is displaced by livestock reaching for forage in front of the enclosure, with the displaceable member being associated with electrical switch means which acts to initiate the operation of the motor to move the enclosure forward a step.

By the use of an enclosure constructed in accordance with the present invention, the livestock can be continuously moved over a chosen area at a speed balanced to the rate of consumption of fodder. The enclosure may be constructed in whatever manner chosen to provide protection from climatic conditions and molestation by creatures which readily attack livestock.

The limited area covered by the enclosure prevents the unnecessary retreading of the land after the crop has been consumed and prevents the return of the livestock to land already grazed, to eat new growth which may appear under favorable conditions, and the previous droppings have had an opportunity of being properly assimilated. By this means possible infestation by disease and parasites in a cyclic manner is prevented.

Movement of the enclosure is co-ordinated with the needs of the livestock, so that it is inched forward only while forage is being consumed, which compels a less than full complement of livestock to consume all available forage before the enclosure is moved.

It is also within the scope of the invention to provide apparatus associated with the enclosure for cultivating, seed and fertilizer sowing, harrowing and rolling the ground with a cross movement immediately following the enclosure to provide a following crop for consumption during the next passage of the enclosure. There may also be provided means for cutting forage before consumption when cut forage is improved by wilting thereby avoiding certain digestive troubles associated with some types of growing forage.

The enclosure may be divided into compartments, each of which is adapted to receive a different size or class of livestock, while a supplementary feeding device may be provided which distributes feed to suit the different livestock occupying the different compartments. A supplementary feeding device may also be provided when only one class of livestock is housed in the enclosure.

It is also proposed to provide an irrigation device upon the enclosure to the water growing of plants at various stages of growth.

In its simplest form of construction, the enclosure may consist of support members which bridge between a fixed vertical shaft with suitable bearings and wheels which move around a circular track centered on the shaft, with the radius of the circle being as great as practical. The support members are provided with walls which confine the livestock, at least part of which walls may be provided with a roof.

With livestock requiring more elaborate housing such as for example poultry, sleeping platforms or slats may be provided either supported on the main structure, or alternatively mounted on skids or wheels on the ground.

Two concentric tracks may be provided, with a smaller track close to the axis of rotation and the other at the outer periphery of the area to be farmed. The tracks may be of any suitable form, but it is preferred to provide concrete tracks of adequate width and depth with or without rollers mounted thereon. The center track may be a circular slab with a vertical shaft embedded in the center thereof.

The accompanying drawings show, by way of example only, one embodiment of the invention in which:

FIGURE 1 is a plan view showing diagrammatically two enclosures running on concentric tracks.

Figure 6:
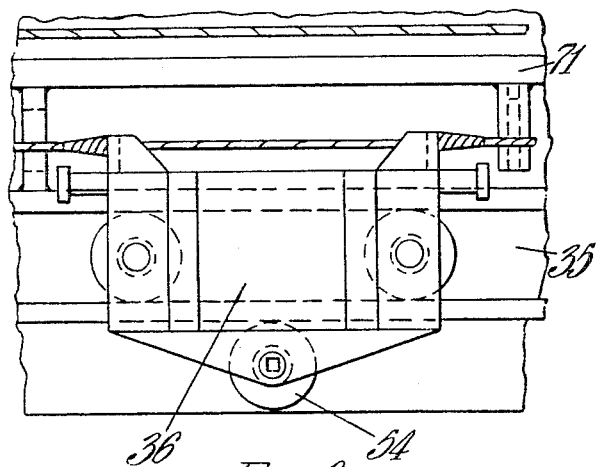
Figure 7:
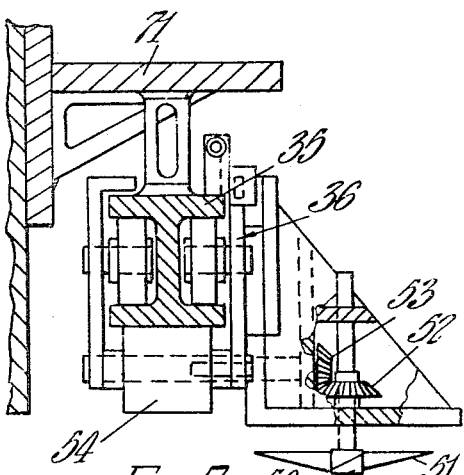

FIGURE 2 is a rear elevation of an enclosure constructed as a brooder house for poultry, FIGURE 3 is an end elevation of the enclosure of FIGURE 2, FIGURE 4 is a part plan on the line IV—IV of FIGURE 5, FIGURE 5 is a cross section on the line V—V of FIGURE 4, FIGURE 6 is a side elevation of the cultivator bogie, FIGURE 7 is a part section of the cultivator, FIGURE 8 is an elevation of seed sowing devices, FIGURE 9 is a part side elevation of the enclosure showing feed hoppers, FIGURE 10 is a part side elevation showing diagrammatically an endless band floor covering, FIGURE 11 is an end elevation of the endless band floor covering of FIGURE 10, FIGURE 12 is a side elevation of a pilot carriage, FIGURE 13 is a plan view of the pilot carriage of FIGURE 12, FIGURE 14 is an end elevation of the carriage of FIGURE 12, and FIGURE 15 shows diagrammatically a device for controlling the movement of a cultivator.

FIGURE 1 shows an arrangement having two enclosures, namely an inner enclosure 1 running upon an inner bearing 2 and a track 3 and an outer enclosure 4 running upon an outer pair of tracks 5 and 6, with all of the tracks being concentric. In accordance with the invention, there may be provided only one enclosure, such for example, the inner enclosure 1, or the outer enclosure 4, or there may be more than two enclosures running upon concentric tracks and it is therefore to be understood that the following description is to be construed as applying to the alternative arrangements mentioned above as appropriate.

In the construction illustrated, the tracks 3, 5 and 6 are formed of concrete and have angular running rails 8 which support flanged wheels 9, while the bearing 2 is formed as a cylindrical block 12 with a flat bearing plate 10, and having a hollow fixed shaft 11 secured in the block 12.

The enclosure is built up upon or incorporates a framed structure, not shown, which bridges between the flat bearing plate 10 and the end wheels, so that the walls of the enclosure are clear of the ground. The enclosure illustrated is designed as a brooder house and is provided with heated compartments 13 connected with front compartments 14 by ramps 15 where the chicks gain access to a suitable growing crop on the ground at 19. Heating by, for example, lamps 16 may be graduated between the center of the compartment 14 where the youngest chicks are housed and the exit by way of the ramp 15 where they leave for the grown forage.

The enclosure is provided with a roof 17 and windows 18.

In one method of cultivation of a crop there are provided inverted arcuate troughs 20 which cover rows of plants which are protected from the livestock and which are allowed to achieve greater maturity and are consumed within, for example, a following enclosure, covering the same path, containing similar or complementary livestock such as pigs or sheep.

The enclosure (or each enclosure) is moved around the track intermittently by means of a winch 21 operated by an electric motor 22, which winds in a cable 23 attached to an anchor trolley 24 on the rails ahead of the enclosure. The forward movement is initiated by the closing of one or more electric switches associated with, for example, hinged flaps or other displaceable means which are movable by slight pressure by the livestock when new forage becomes visible underneath the displaceable means. The displaceable means may occupy only a small part of the front wall of the enclosure and thus allow the rigid wall to support supplementary food or water troughs and so on.

When the enclosure is divided into separate compartments as shown in the drawings, each compartment is provided with a flap 25 which operates a switch 26 which closes the circuit to the motor 22 momentarily, and performs a cycle of operations which moves the enclosure forward a predetermined distance. The flaps may be arranged to initiate the cycle of movement individually and independently of one another, or they may be interconnected electrically so that the enclosure does not move until all the flaps have been moved by the livestock.

The anchor trolley 24 is provided with a hinged hook 27 which engages upon one of a number of anchorages 28 provided in the track. When the enclosure has reached the position where buffer 29 compresses spring 30 of buffer 31, the current to the motor is interrupted by the stop member on the cable contacting switch 32, and it is then necessary for the anchor trolley 24 to be moved forward to a new position. This is achieved by firstly disengaging the winch 21 from the drive from the motor 22, which allows the spring 30 to push the trolley forward enough to disengage the hook 27 from the anchorage 28, after which the electric motor 30 is operated to move the trolley forward to the next anchorage, with the winch paying out the cable as the trolley moves.

An electric switch 33 may be associated with the hook 27 which is closed when the latter rests upon the concrete between the rails as shown in chain dotted lines and keeps the motor 30 running until the hook 27 drops on to the next anchorage 28. The drive from the motor 22 is then re-engaged and the enclosure continues its cycles of motion forward. Alternatively, the trolley may be provided with a handle so that it may be moved by hand instead of by an electric motor. The electric motor can conveniently be driven by a battery 34.

In order to cultivate the ground behind the enclosure after the forage has been consumed, so as to intermingle the livestock droppings and crop residues immediately after the passage of the enclosure, there may be provided a cultivating device which runs on a steel section bracketed out from the enclosure to the full length of the latter and supports a wheeled bogie 36 (see FIG. 6).

This bogie is drawn back and forth along the steel section by a cable passing over end pulleys 37 and 38 by a reversible electric motor 39 driving a drum 40. The action of this motor is controlled firstly by the forward motion of the enclosure to prevent operation except when the enclosure is stationary, while the backwards and forwards movement of the bogie is controlled by switches 41 and 42 operated by projections 43 and 44 respectively upon the bogie 36.

The distance travelled by the enclosure between each run of the cultivator may be controlled, for example, by a grooved wheel 45 (see FIG. 15) with which the cable 23 engages and operates switches 46. The wheel 45 is prevented from rotating when the cable is being unwound by a ratchet 47.

To allow for the radial nature of the strips of ground to be cultivated, intermediate switches may be fitted so that full length strips may be interspersed with shorter strips.

A similar steel section may be bracketed off the front of the enclosure and have a like wheeled bogie 49 driven by an electric motor by way of a cable and drum 48. Both of the bogies are provided with a plate upon which one of a plurality of alternative cultivators may be attached. For example, the bogie in front may be fitted with an arrangement as shown in FIGURE 7 having a forage cutting wheel 50 with detachable teeth 51, driven by bevel pinions 52 and 53 from a roller 54 engaging upon the lower flange of steel section 35. By this means, the forage is cut at a height which allows the plant to sprout a second crop, while the tops are allowed to wilt before becoming available to the livestock.

The cultivator device may take the form shown in FIGURE 8 which is provided with one or more curved tines which are mounted upon a horizontal plate and are rotatable about a vertical axis so as to adjust themselves to the different directions of running without the necessity of being withdrawn from the ground. Spikes may also be fitted spaced from the tines to prepare the ground for seed and fertilizer. Separate hoppers 55 and 56 are provided for the seed and fertilizer with cup feeds caused to rotate in conjunction with a roller 57 mounted below the device. The roller rests on the ground and covers in the seed and fertilizer, while two seed-drill drawing tines 58 and 59 may be fitted before the seed and fertilizer chutes.

With the object of using forage to the best advantage, there may be the need to feed concentrated mixtures of meal or a balanced equivalent in pellet form to the livestock in a controlled manner. A contrivance for this purpose is shown in FIGURE 9 in which there is provided a travelling hopper 60 mounted on wheels on a track running the length of the enclosure which allows food to fall into fixed troughs 61 mounted on the wall of the enclosure, for example, the inside of the front wall, or alternatively the hopper and track may be on the outside where it is inaccessible to the livestock.

The outlet from the hopper may be controlled by a hinged door operated by a lever 63 having a roller or wheel 64 which engages on a track 65 adjustable as to height by means of cams 66, to control the amount of food deposited in the trough. If the track is lowered by the attendant to its extremity, the lever remains statutory and the trough is not filled.

The frequency of filling of the troughs may be controlled by the electric switches on the grooved wheel of FIGURE 15 previously described. The same device may be used to control the filling of the movable hopper 60 from a fixed hopper 67 at the end of the track. The fixed hopper door is opened in a similar manner to that of the movable hopper.

A main water supply may be led to the enclosure by way of the hollow shaft 11 via pipe 68 to a ball cock 69 floating on the water in a circular tank 70. The tank is mounted on a platform on support 71 resting on the circular plate bearing 10, and rotates with the enclosure. The tank is protected by a cover 72. The supply to the enclosure is taken from the tank by way of pipe 73. The level of the water in the troughs in the enclosure may be controlled by a further ball cock 80.

Electrical supply to the enclosure may be taken up the hollow shaft 11 and connection made to the mains of the enclosure by means of slip rings 74 and 75 and brushes 76 held in contact by spring 77. A necessary protecting switch 78 is provided for operation before access can be obtained to a cover 79 for the slip rings and brushes.

A perforated irrigation pipe 81 supported upon a suitable bridge member may be provided behind the enclosure for watering sown ground or over plants. The inner end of the pipe is supported close to the hollow shaft 11 while the outer end is supported upon a small wheeled carriage 82, in which the weight is taken by a wheel 83 (see FIGS. 12, 13 and 14) resting on the track between the rails 8 and guided by flanged wheels 84. The connection with the irrigation pipe support is by way of a vertical pin 85.

The pipe is connected to the supply by a flexible pipe 86 so that by a change of length of the towing cable, or chain 87, the distance of the pipe behind the enclosure can be adjusted as required.

The water can be supplied from the supply tank 70 or the main supply and be controlled by the movement of the enclosure, so that the water supply is cut off when the enclosure is stationary.

When the enclosure is constructed as a chicken brooder, a suitable flexible sheet material formed as a continuous band may be positioned across brooder floor 89 as shown in FIGURES 10 and 11, passing about rollers 90 at its ends, and returning below the floor. Wheels 91, drivingly connected to the rollers 90 rest upon the ground and move the band as the enclosure moves. A brush 92 fitted below the band clears off the adhering droppings as the band passes. A hopper 93 may be provided which sprinkles a metered quantity of sand on to the band at an adjustable rate to provide an absorbent which is easily brushed away as the band revolves. The wheel may be provided with detachable brushes 94 for ease of replacement of the endless band.

As previously mentioned, there is shown in FIGURE 1 and 2 provisions for an enclosure which moves on an outer pair of co-axial tracks independently of the inner enclosure. The method of construction and mode of operation can be similar to the inner enclosure, and may be constructed to house like livestock or different livestock. Two anchor trolleys 24 are provided which act in the same manner as previously and are balanced as between one another to give the desired circumferential movement.

Although an electric generator may be provided upon the outer enclosure, it is preferred to carry the electric and water supplies on an overhead structure 95 above the inner enclosure.

The outer enclosure may thus provide a communicating bridge to the inner enclosure area for the transport of bulk food, or a reinforced track below the cultivation level may be provided to give support for a wheeled vehicle.

The outer enclosure, due to its long circumferential path, can be made to cover a full cycle of crop growth, with provision of fully matured crops in a rotation setting to be automatically moved over in late winter and early spring.

Further circular areas of wide coverage can allow for the movement of several enclosures with the advantage of being able to grow perennial forage crops so as to give exact periods of recovery after each grazing, and also achieve some arable rotations away from livestock.

Although the constructions hereinbefore described relate to circular motion of the enclosure around a fixed point, it is within the scope of the invention to provide a closed path for the enclosure having a pair of tracks part of which may be parallel so that the enclosure operates over land areas of varying shapes. For this purpose, the wheels supporting the enclosure may be of the kind shown in FIGURES 12, 13 and 14 which allow pivoting of the wheels about a vertical axis to allow the wheel or wheels to follow changes in curvature of the track.

It is to be understood that the above description is by way of example only, and that details for carrying the invention into effect may be varied without departing from the scope of the invention.

I claim:

1. A system for the housing and feeding of livestock comprising running track laid in a closed path upon the ground over which livestock is intended to forage for food, an enclosure for livestock having a bottom opening, wheels on which said enclosure is mounted, movable along said track, an anchor trolley movable along said track and positioned in front of the enclosure, anchor means operably related to said trolley for preventing movement of the trolley in the direction of the enclosure, a motor driven drum winch upon the enclosure, cable means wound around the drum of the winch and connected to said anchor trolley, at least one displaceable member positioned in the front boundary of the enclosure and close to the ground, which is displaceable by livestock within the enclosure reaching for forage in front of the enclosure, and electrical switch means operably associated with said displaceable member serving to initiate operation of the winch motor to move the enclosure forward along the track step by step.

2. A system for the housing and feeding of livestock comprising running rails laid in a circular path upon the ground over which livestock is intended to forage for food, a roofed enclosure for livestock, part at least of said enclosure being open below, wheels on which said enclosure is mounted movable along said rails, a wheeled anchor trolley movable along said rails and positioned in front of the enclosure, a hook-like anchor means, an anchor member upon the running rails, said hook-like anchor means engaging said anchor member for preventing movement of the trolley in the direction of the enclosure, a source of electric current, an electric motor driven drum winch upon the enclosure, a cable wound around the drum of the winch and connected to said anchor trolley, an electric motor upon the anchor trolley drivingly connected to at least one wheel thereof for driving the trolley in a direction away from the enclosure for drawing the cable from said winch upon the enclosure to engage the hook-line means on an anchor member, and at least one vertical flap hinged above and having an electric switch which is operated when the flap is moved out of the vertical by livestock within the enclosure reaching for forage in front of the enclosure, to initiate operation of the winch motor to move the enclosure forward along the rails step by step.

3. The system as claimed in claim 1 in which the enclosure further includes a support rail parallel to the ground and transversely of the running track, attachment means upon the support rail for an agricultural device, and a motor for driving the device over the ground when the enclosure is stationary.

4. The system as claimed in claim 1 in which the enclosure further includes a support rail parallel to the ground and transversely of the running track, a hopper mounted upon the support rail, and discharge means for causing the hopper to discharge an adjustable quantity of its contents at selected points along the rail.

5. The system as claimed in claim 1 in which there is provided behind the enclosure a support trolley and a perforated irrigation pipe supported by the trolley and connected to the enclosure by cable means which is adjustable as to its length to adjust the position of the pipe relative to the enclosure.

6. The system as claimed in claim 1 in which the wheels upon which the enclosure is mounted are pivotable about a vertical axis to allow said wheels to follow change of curvature in the track.

References Cited by the Examiner

UNITED STATES PATENTS

| | | | |
|---|---|---|---|
| 631,541 | 8/1899 | Hewitt | 119—21 |
| 2,474,932 | 7/1949 | Clark | 119—21 |
| 2,969,040 | 1/1961 | Siptrott | 119—21 |

SAMUEL KOREN, *Primary Examiner.*

HUGH R. CHAMBLEE, *Examiner.*